United States Patent

Seidel et al.

[11] Patent Number: 5,605,519
[45] Date of Patent: * Feb. 25, 1997

[54] METHOD FOR CONTROLLING KICKDOWN WHILE BRAKING AND AS A FUNCTION OF VEHICLE'S OPERATING PARAMETERS

[75] Inventors: Willi Seidel, Eberdingen-Hochdorf; Joseph Petersmann, Wimsheim, both of Germany

[73] Assignee: Dr. Ing. h.c.F. Porsche AG, Weissach, Germany

[ * ] Notice: The term of this patent shall not extend beyond the expiration date of Pat. No. 5,474,505.

[21] Appl. No.: 167,924

[22] PCT Filed: May 21, 1992

[86] PCT No.: PCT/EP92/01136

§ 371 Date: Jun. 22, 1994

§ 102(e) Date: Jun. 22, 1994

[87] PCT Pub. No.: WO93/00624

PCT Pub. Date: Jan. 7, 1993

[30] Foreign Application Priority Data

Jun. 21, 1991 [DE] Germany .......................... 41 20 603.7

[51] Int. Cl.⁶ .............. G05D 1/02; B60K 31/12; B60K 41/06
[52] U.S. Cl. .................. 477/120; 477/62; 477/158; 477/141
[58] Field of Search .................... 477/120, 121, 477/138, 139, 140, 141, 158, 62

[56] References Cited

U.S. PATENT DOCUMENTS

| | | | |
|---|---|---|---|
| 5,025,684 | 6/1991 | Stehle et al. | 477/62 |
| 5,054,336 | 10/1991 | Takizawa | 477/120 X |
| 5,157,609 | 10/1992 | Stehle et al. | 477/120 X |
| 5,389,050 | 2/1995 | Sakai et al. | 477/158 X |
| 5,474,505 | 12/1995 | Seidel et al. | 477/43 X |

FOREIGN PATENT DOCUMENTS

| | | |
|---|---|---|
| 3012896 | 4/1980 | Germany . |
| 3341652 | 11/1983 | Germany . |
| 3615961 | 5/1986 | Germany . |
| 2222645 | 3/1990 | United Kingdom . |

*Primary Examiner*—Khoi Q. Ta
*Attorney, Agent, or Firm*—Evenson, McKeown, Edwards & Lenahan, P.L.L.C.

[57] ABSTRACT

A method for controlling preferably an electro-hydraulic automatic transmission of a motor vehicle fitted with a combustion engine provides a gradual kick-down while braking. In particular the kick-down is performed when, in the course of approaching a bend, a condition is activated, which prevents upshifting. The upshift prevention is initiated when the accelerator pedal is released quickly during shearing action. The upshift prevention stops if after an interval, upon detection of tensile action, the vehicle does drive round a bend. The upshift prevention is followed by a gradual adaptation of the gear level to the shift parameter.

25 Claims, 5 Drawing Sheets

METHOD FOR CONTROLLING KICKDOWN WHILE BRAKING AND AS A FUNCTION OF VEHICLE'S OPERATING PARAMETERS

BACKGROUND AND SUMMARY OF THE INVENTION

This invention relates to a method for controlling preferably an electro-hydraulic automatic transmission of a motor vehicle specially fitted with a combustion engine, while the combustion engine can be influenced via control elements, preferably an accelerator pedal or a throttle valve, and gear levels of a transmission are shifted via shifting parameters which, at least as a function of the throttle valve position, the traveling speed and motor speed, are shifted automatically.

Common automotive transmissions of motor vehicles powered by combustion engines initiate, as a rule, an upshift (reduction of the speed ratio) when releasing the accelerator pedal. This, however, is not always desirable when driving around bends, because this type of change of load may possibly result in unsafe driving conditions or, when reaccelerating the vehicle by stepping on the gas, it is necessary to force one or several kick-downs (increase in the speed ratio).

From DE 33 41 652 C2, (having corresponding U.S. counterpart U.S. Pat. No. 4,679,145) it has become common knowledge that this type of upshifting in bends can be avoided through recording the transverse acceleration of the vehicle. However, by these means, one would merely avoid upshifting in bends.

In order to be able to avoid upshifting as soon as the vehicle approaches a bend, during the method of controlling an automatic transmission according to DE 39 22 040 A1, the change of speed effected by the accelerator pedal is recorded and by dropping below a specific (negative) limiting value, a signal preventing the upshifting is transmitted if a shearing action is detected. As a result, upshifting is prevented until the tensile action occurs and a fixed interval has passed.

DE 39 22 040 A1 (having corresponding U.S. counterpart U.S. Pat. No. 5,157,609) also provides that this interval is a function of an additional parameter (driving activity), which is derived from a multitude of operating or driving parameters of a motor vehicle and evaluates the driver's style of driving or a momentarily existing traffic situation.

In view of the state-of-the-art referred to in the foregoing, it is the object of the present invention to create a method for controlling an automatic transmission of a motor vehicle, which is improved further with respect to shift performance during braking, especially before entering bends.

The foregoing object is achieved in the present invention by the characteristic features that a gradual kick-down (increase in the gear ratio) occurs when a service brake of the vehicle is engaged, or alternatively in addition or supplementary thereto, the time variation of the traveling speed is less than a first negative longitudinal acceleration limiting value; and the transversal acceleration recorded by the transversal acceleration sensor lies below a first traveling speed-dependent transversal acceleration limit; and the time variation of the traveling speed is higher than a second negative longitudinal acceleration limiting value; and the traveling speed is less than a second traveling speed acceleration limiting value. Further characteristics as a development of the invention are described herein.

The advantages of the invention are primarily that a method for controlling an automatic transmission of a motor vehicle has been created, in which the shifting performance during braking, in particular before entering bends, has been improved further.

When reducing a vehicle's speed by braking, automatic kick-downs can be executed under certain conditions; the maintaining of conditions ensures a safe operation of the vehicle. The method especially ensures that the transversal acceleration is not too high, the vehicle's deceleration is not too great and the traveling speed is not too high, so as to avoid a loss, especially in the longitudinal and lateral stability of the wheels of the vehicle.

The brake torque of the driving (combustion) motor, which after kick-down has a stronger effect on the drive gears, can therefore not have a negative effect on the driving performance of the vehicle. In this case, kick-down occurs gradually, always by an interposition of a specific interval.

Kick-down while braking is preferably initiated when an upshift prevention condition is active. This is activated by a known method when the vehicle approaches a bend and the driver releases the accelerator pedal relatively fast.

On the one hand, by performing kick-downs during braking, the braking action of the vehicle's prime mover is intensified when in shearing action, so that the brakes (service brake) of the vehicle are relieved. On the other hand, in connection with maintaining the speed before, in the course of and after driving the bend, the driver, after passing through the bend, can always operate at the optimal gear level to reaccelerate the vehicle.

In the following, the invention is explained in greater detail by means of the drawing and particular embodiments.

DETAILED DESCRIPTION OF THE INVENTION

Figure 1:
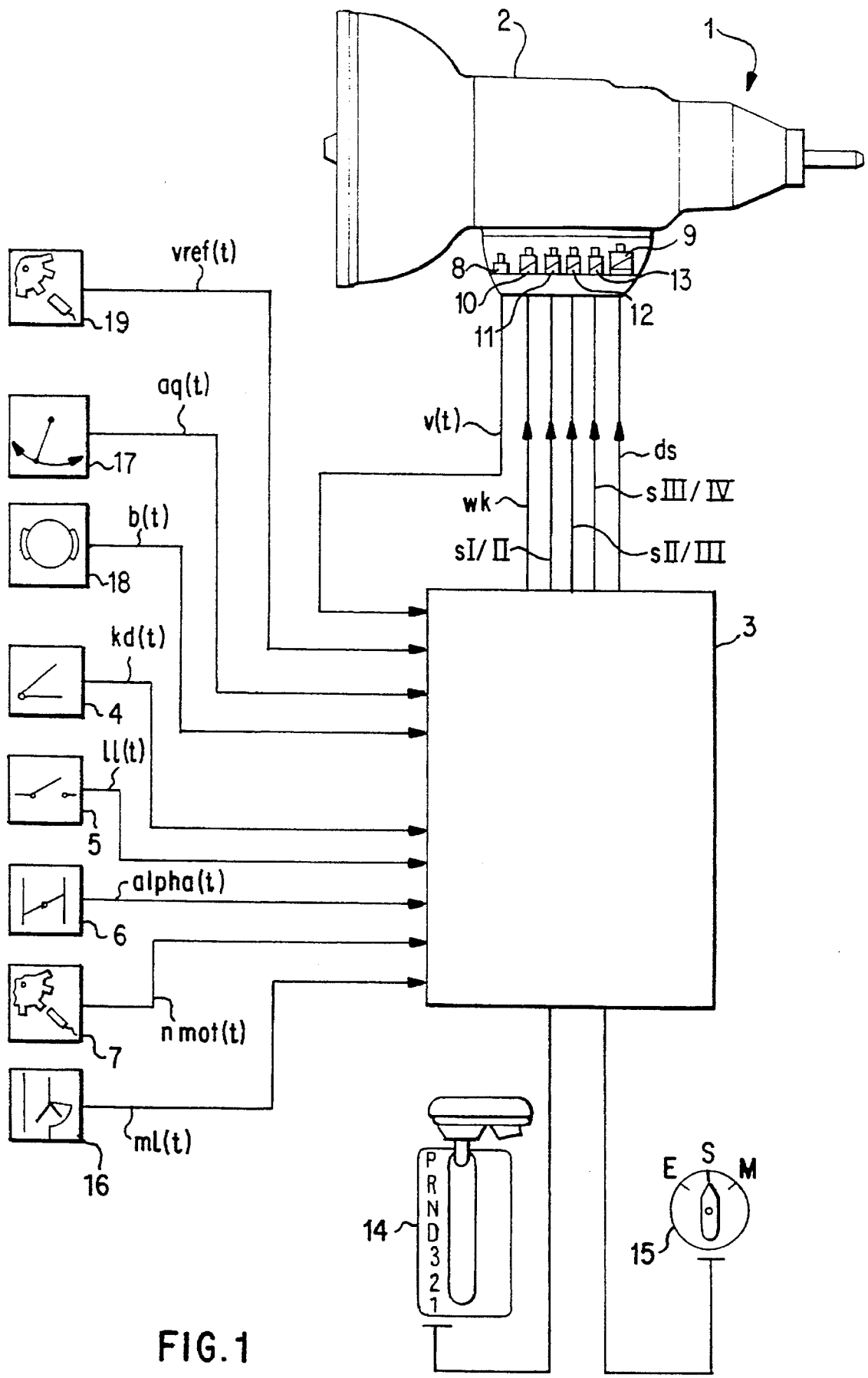
FIG. 1 shows a circuit diagram of an electro-hydraulic control of an automatic transmission of a motor vehicle.

FIG. 1 shows an electro-hydraulic control 1 of an automatic motor vehicle transmission 2 as, for example, is described in Bosch's "Technische Berichte", 7 (1983) 4, pp. 160 though 166, and in ATZ 85 (19983) 5, pp. 401 through 405.

Quantities or signals, which change with time t, are presented in the following with f(t).

A controlling apparatus 3 performs the controlling action as a function of a kick-down signal kd(t) of a kick-down transmitter 4 at the accelerator pedal of the motor vehicle, and as a function of an idling signal 11(t) of a throttle valve switch 5, as a function of a throttle valve position alpha(t) of a throttle valve angle transmitter 6 (or an equivalent position transmitter for positioning an element, for example, an accelerator pedal or an injection pump lever of a self-igniting diesel combustion engine, which influences the performance of the prime mover of the vehicle), as a function of a motor speed nmot(t) of a motor speed transmitter 7 of a combustion engine (not shown), and as a function of a traveling speed v(t) (transmission starting speed) of a transmission starting speed transmitter 8,

- a pressure regulator 9 to regulate the pressure of a hydraulic fluid (signal output ds),
- a first solenoid-operated valve 10 for controlling a converter or a converter bridging coupler (signal output wk),
- a second solenoid-operated valve 11 for controlling a gear level change between gear levels I and II (signal output sI/II),
- a third solenoid-operated valve 12 for controlling a gear level change between gear levels III and III (signal output sII/III),
- a fourth solenoid-operated valve 13 for controlling a gear level change between gear levels III and IV (signal output sIII/IV).

The control system is usually controlled by the operator via a selector lever 14 for preselecting shift levels P, R, N, D, 3, 2, 1. Said lever allows the use of shift level P (parking brake), R (reverse gear level), N (neutral gear level), D (automatic shifting of all four gear levels IV, III, II, I) 3 (automatic shifting of gear levels III, II, I), 2 (automatic shifting of gear levels II, I) I (fixing the first gear level I).

With the above-described transmission, a program selector 15 is provided with which at least two shift programs ("E" for a consumption-optimized shift program (shift parameter SKF1), "S" for a performance-optimized (shift parameter SKF5), "M" for a manual program, in which gear levels IV, III, II, I can be preselected directly via positions D, 3, 2 and 1) or two shift parameters SKFj can be selected manually according to which the four gear levels in shift levels D, III and II are shifted automatically.

A control method may be implemented in the controlling apparatus 3 as an alternative to the program selector switch 15, which, for example, according to DE 33 48 652 C2 or DE 39 22 051 A1, (corresponding to U.S. Pat. No. 4,679,145 and 5,157,609, the originally filed specifications which corresponding to DE 33 48 652 C2 and DE 39 22 051 A1, respectively, being incorporated by reference herein) makes a long-term evaluation of the driver's style of driving or his handling of the traffic situation with respect to controlling the vehicle, and concludes a driving activity SK(t) (accelerator pedal activity) from one or several operating or driving parameters. On the basis of this driving activity SK(t), corresponding to the shift position of the change-over switch 15, then one of several shift programs or shift parameters SKFj can be applied for shifting gear levels IV, III, II, I.

To execute said method, apart from the transmitters 4 through 7, additional transmitters can be applied, for example, an air flow or supply sensor 16, which detects the air flow or volume ml(t) fed to the combustion engine, as well as a transversal accelerator transmitter 17 (transversal acceleration aq(t) and a brake signal transmitter 18 (brake signal b(t)) are required, and a reference speed transmitter 19, which detects the speed of the wheels of a non-driven axis (reference speed vref(t)).

It is, in particular, desirable to avoid an upshift of such a transmission when the vehicle, for example, approaches a bend and the driver releases the accelerator pedal.

As is illustrated in DE 39 22 040 A1 and DE 39 22 051 A1, this method of identifying a bend may occur through scanning the time variation of the throttle valve position dalpha(t)/dt. Usually, a driver releases the accelerator pedal—and as a rule also the throttle valve—faster before entering the bend than under normal circumstances to reduce, for example, the driving speed v(t).

According to the method, an upshift effected while releasing or not operating the accelerator pedal on common transmission controls with change speed drive is prevented, so long as the condition of upshift prevention hsv is active, hsv=1, while the condition of upshift prevention changes from inactive hsv=0 to active hsv—1 when a time variation dalpha(t)/dt of the throttle valve position alpha(t) goes below a negative limiting value—alphag and the shearing action is identified. The condition of uplift prevention hsv changes to inactive hsv=0, as soon as the tensile action has been identified after completion of the first interval TI(KK(t)).

What matters with tensile action and shearing action is the system under consideration, where the following differences may exist:

- Overall system for motor vehicles: Tensile action is defined as the acceleration of the vehicle (time variation of speed) dv(t)/dtdt>0, while the shearing action corresponds go a deceleration of the vehicle dv(t)/dt<0.
- System coupling (torque converter/transmission: During tensile action, the input speed of the clutch (of the torque converter) greater than its output speed/the transmission is tensioned in an opposite direction, while during shearing action the input speed is lower that the output speed/the transmission is tensioned in the same direction.
- System of the combustion engine: Tensile action here is defined as the throttle valve position alpha(t)>0 (throttle valve open) and the time variation of the motor speed dnmot(t)/dt>0, while during shearing action the throttle valve position is alpha(t)=0 (throttle valve closed) and the time variation of the motor speed is dnmot(t)/dt<0.

Figure 2:
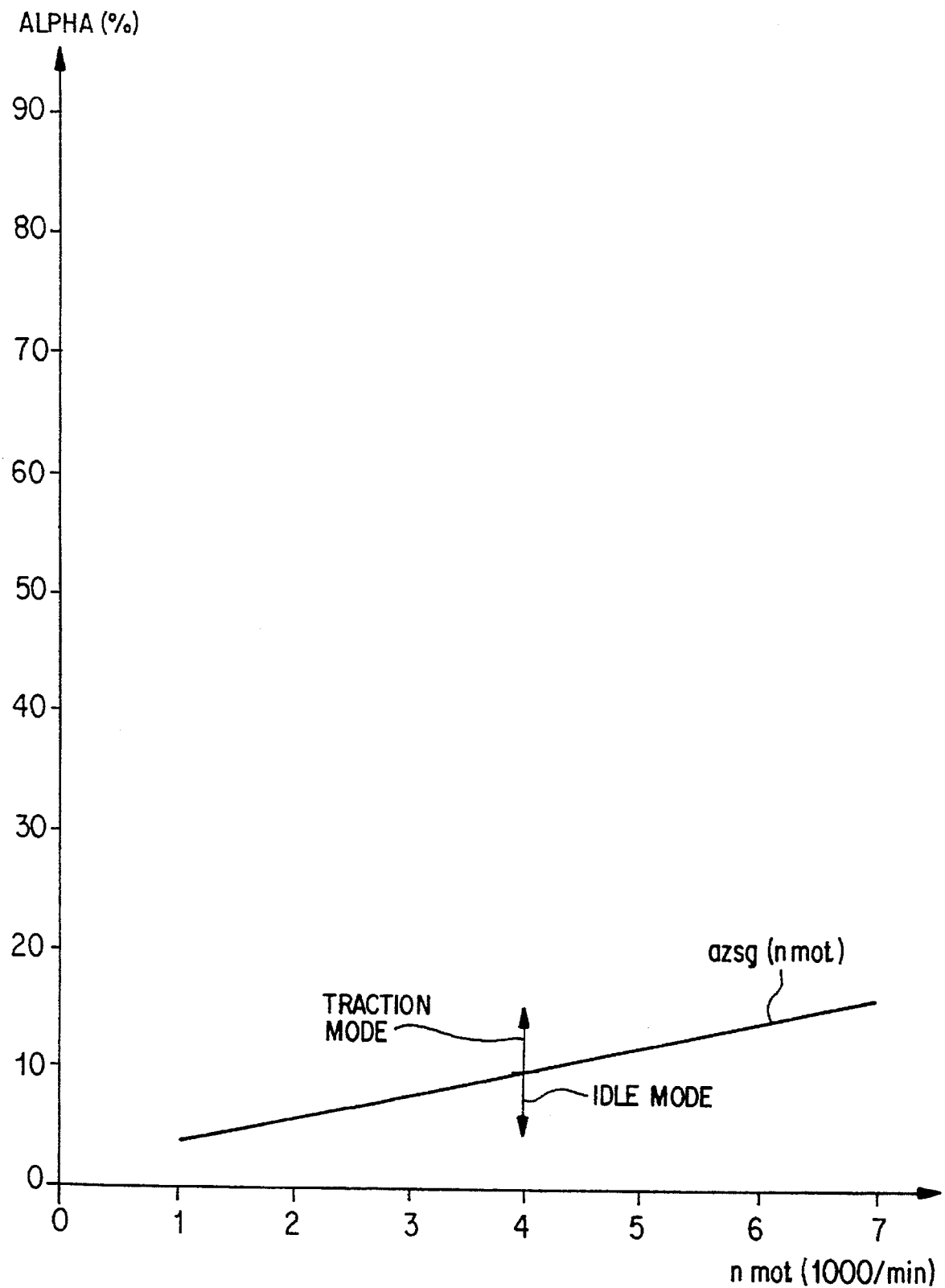
FIG. 2 shows a limiting characteristic curve for identifying the shearing/tensile action.

Concerning the transmission control and the overall performance of the vehicle it has proven practical to simulate the terms tensile action and shearing action as follows:

- Shearing action is identified when the throttle valve position alpha(t) drops below a motor speed-dependent limiting characteristic curve azsg(nmot), as is shown on FIG. 2: alpha(t)<azsg(nmot).
- Tension action is identified when the throttle valve position alpha(t) exceeds the motor speed-dependent limiting characteristic curve azsg(nmot) according to FIG. 2 and adapts the time variation of the traveling speed dv)t)/dt adapts positive values: alpha(t)>azsg(nmot)∩dv(t)/dt>0.

The patent application overall makes reference to the above-defined terms tensile action and shearing action.

According to the invention, the braking action enables gradual kick-downs. Gradual kick-downs occurs only when

- a service brake of the vehicle is engaged, brake signal b(t)=1, or alternatively in addition or supplementary thereto, the time variation of the traveling speed dv(t)/dt is less than a first negative longitudinal acceleration limiting value albg(g, nmot, t), albg(g, nmot, t)<0: dv(t)/dt<albg(g, nmot, t); and
- the transversal acceleration aq(t) recorded by means of the tranversal acceleration sensor 17 lies below a first traveling speed-dependent transversal acceleration limit aqgl(v(t)): aq(t)<aqgl(v(t)); and
- the time variation of the traveling speed dv(t)/dt is higher than a second negative longitudinal acceleration limiting value albbg(nmot, g, SK(t), t)=k(g−1, SK(t))*dv/dtl$_{g-l}$: dv(t)dt>albbg(nmot, g, SK(t), t); dv(t)dt>=k(g−1, SK(t))*dv/dtl$_{g-l}$; and the traveling speed v(t) is less than a second traveling speed acceleration limiting value vg(g, SK(t), t): v(y)<vg(g, SK(t), t).

Kick-down is performed preferably only when the above conditions are met and further, if the condition of the upshift prevention is active, hvs=1.

Kick-down is always performed by one gear level, while between shifting actions there lies at least a second interval T2(SK(t)). The gradual kick-down is performed to the gear level g, which is acceptable for the instantaneous operating point of the vehicle in the instantaneously set shift parameter (SKFj) (to avoid overspeeding of the combustion engine).

Figure 3:
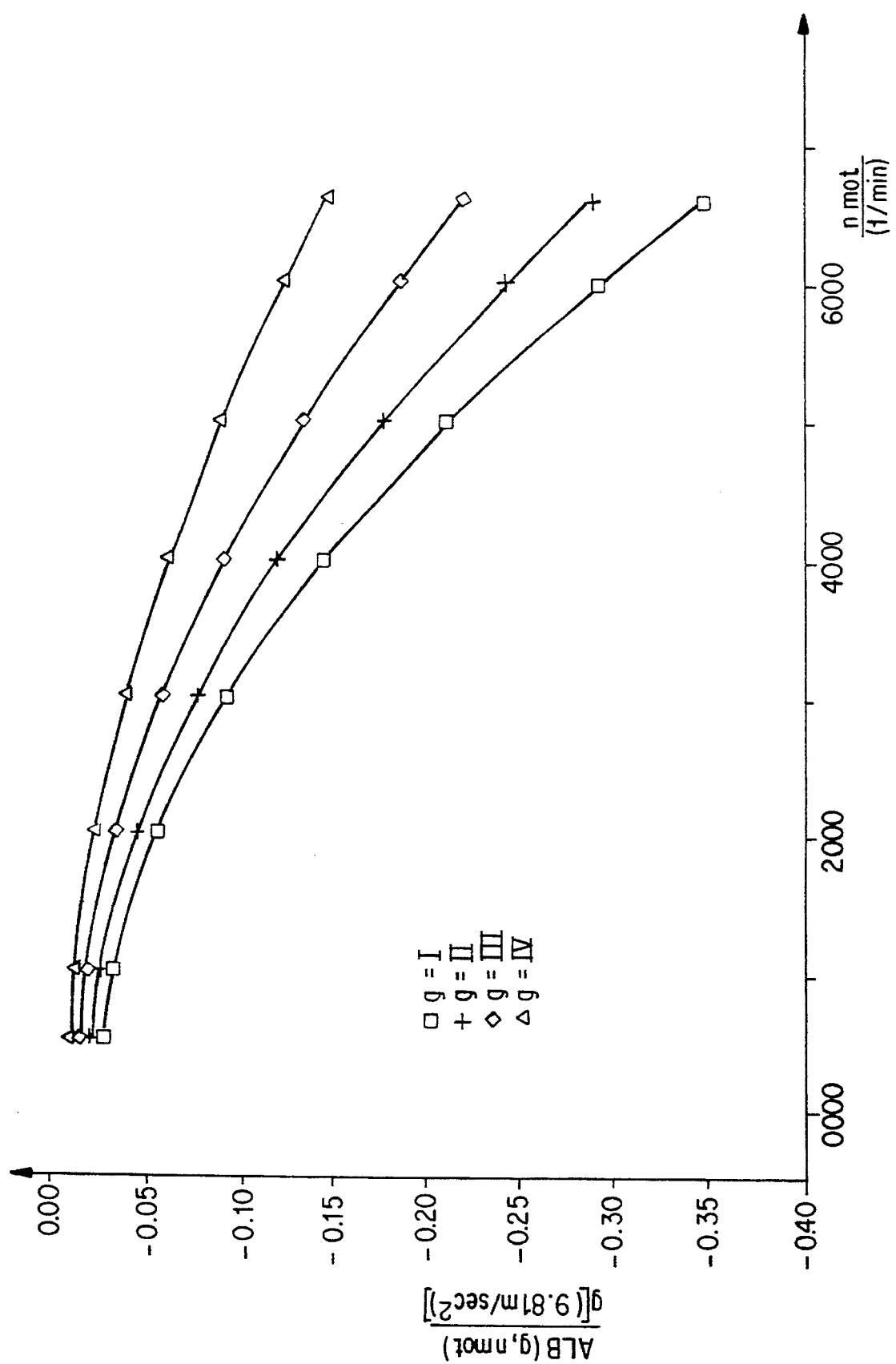
FIG. 3 shows a parameter of a motor speed-dependent and gear level-dependent parameter value.

The first negative longitudinal acceleration limiting value albg(g, nmot, t) is a function of the instantaneous values of the engaged gear level g and the motor speed nmot(t) and in this case corresponds to the respective (negative) longitudinal acceleration dv/dt (and thus the deceleration) of the vehicle running with a shut throttle valve alpha=0 in the condition defined herein (loading, tire pressure, environmental factors, etc.) on a level roadway, with the respective pairs of value of the instantaneously engaged gear level g and the motor speed nmot(t). The first negative longitudinal acceleration limiting value albg(g, nmot, t) is determined from the instantaneous values of these quantities, preferably via a first parameter ALB(g, nmot): albg(g, nmot, t)=ALB(g, nmot). An example for such a first parameter ALB(g, nmot) is shown in FIG. 3. As an alternative it is, by all means, possible to determine the longitudinal acceleration limiting values albg(g, nmot, t) via a corresponding functional correlation.

The limiting curves according to FIG. 3 clearly shows the dependence of the deceleration values of a vehicle driven by a combustion engine from the gear level g and the motor speed nmot(t). The individual limiting curves—without limiting the generality—of the four gear levels I, II, III, IV here allocate the values applied to the horizontal axis for the motor speed nmot in rotations per minute (1/min) to a respective specific value ALB applied to the vertical axis as unit g=9.81... meters per second$_2$(9.81 m/s$_2$).

For growing values of the motor speed nmot(t) the deceleration values increase as a result of concentrated braking effect of the motor and the increasing rolling resistance (drag) of the vehicle. There also is an increase in the deceleration values as the gear level g diminishes, because the brake torque of the combustion engine increases the deceleration rate of the vehicle due to the increase in the gear ratio.

Figure 4:
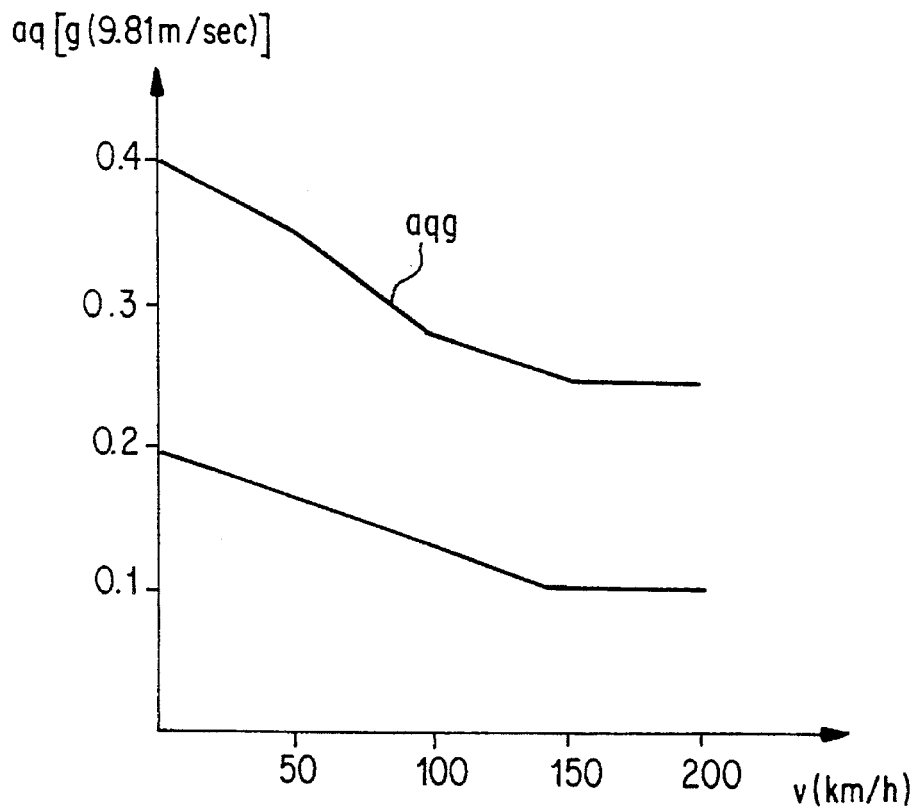
FIG. 4 shows a first and a second limiting characteristic curve for a transversal acceleration.

The first transversal acceleration limit aqgl(v(t)) in this case is preferably a function of the traveling speed, and the corresponding assigned limiting values as a result of a limit of a specific traveling speed v(t) are reduced as the traveling speed v(t) increases. A corresponding characteristic curve is shown in FIG. 4.

The second negative longitudinal acceleration limiting value albbg(nmot, g, SK(t))=k(g−1, SK(t))*dv/dtl$_{g-l}$ is determined according to a product from a gear level-dependent factor k(g−1, SK(t)) and a value computed with respect to the vehicle's instantaneous operating condition, which can be expected during acceleration dv/dtl$_{g-l}$ at the next lowest gear level g−1.

In order to determine said longitudinal acceleration dv/dtl$_{g-l}$ expected at said next lowest gear level g−1, the value of the instantaneous traveling speed v(t) taken from which then is determined the next lowest gear level g−1 of the expected motor speed nmot(t)l$_{g-l}$=i(g−1)*v(t). For this purpose, the product is formed from the instantaneous value of the traveling speed v(t) and that of the transmission ratio i(g−1) in the next lowest gear level g−1.

The value of the longitudinal acceleration dv/dtl$_{g-l}$ to be expected in the next lowest gear level g−1 is ultimately determined via the parameter ALB(g, nmot) from the next lowest gear level g−1 and the motor speed nmot(t)l$_{g-l}$ to be expected in next lowest gear level.

Figure 5:
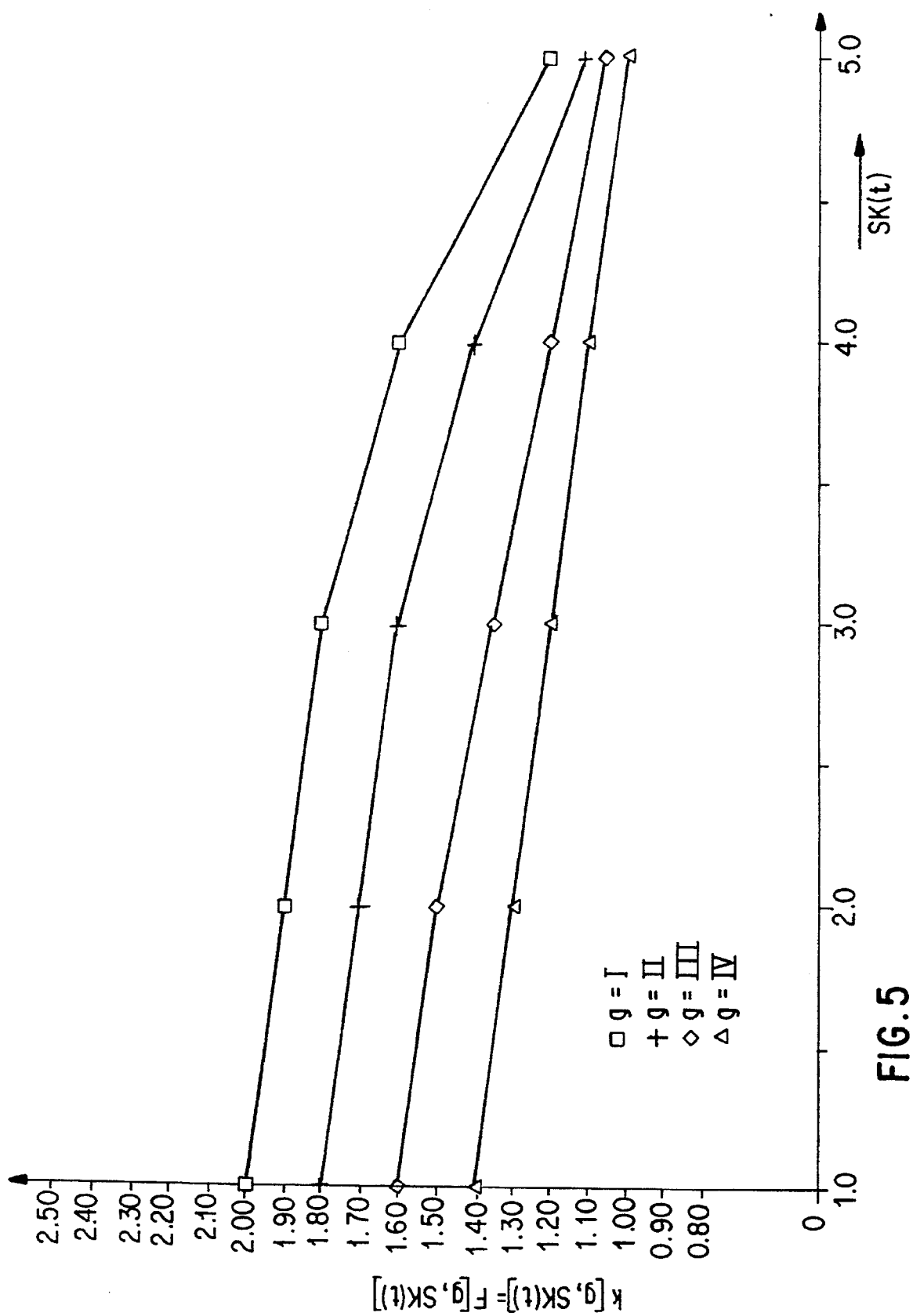
FIG. 5 shows the parameter of a gear level-dependent and driving activity-dependent factor.

The gear level-dependent factor k(g−1, SK(t)) is determine via a second parameter F(g, SK(t)) from the next lowest gear level (g−1): k(g−1, SK(t))=F(g, SK(t)). An example for a second parameter is shown in FIG. 5.

The second traveling speed limiting value vg(g, SK(t), t) is a function of the gear level g and the driving activity SK(t).

The effect of the individual steps of the method described herein are explained as follows:

By monitoring the activity of the vehicle's service brake (brake signal b(t)=1) or as an alternative or addition hereto, or by checking whether the time variation of the traveling speed dv(t)/dt is below the first negative acceleration limiting value albg(g, nmot), dv(t)/dt<albg(g, nmot), the desired driving speed is obtained after increased deceleration of the vehicle or kick-down.

By checking whether the transversal acceleration aq(t) is below the first transversal acceleration limit aqgl(v(t)), it is monitored whether the vehicle is already in a bend at a relatively high transversal acceleration aq(t). If the vehicle actually is driving in the bend, the kick-down is forestalled, so as to prevent loss of frictional connection between wheel and roadway, which otherwise increases due to the increase in the brake effect.

A comparative safety function is represented by monitoring the reduction of the second negative longitudinal acceleration limiting value albbg(nmot, g, SK(t): In this case, it is determined whether the expected deceleration of the vehicle, following the required kick-down, would lead to exceeding the static friction limit of the wheels.

For this purpose, from the deceleration due to weighting (multiplication) with the gear level-dependent factor k(g−1, SK(t)), which can be expected during the instantaneous driving condition of the vehicle following the kick-down, an instantaneous maximum acceptable deceleration is determined, which is compared with the instantaneous vehicle deceleration dv(t)/dt; if the instantaneous deceleration is higher, the kick-down is prevented.

The gear level-dependent factor k(g−1, SK(t)) takes into consideration that the second negative longitudinal acceleration limiting value albbg must be lower than the first negative longitudinal acceleration limiting value albg(g, nmot), i.e. in terms of quantity it is greater (corresponding to a higher deceleration rate).

By monitoring the gear level-dependent traveling speed limiting value vg(g, SK(t), t), additional safety criteria can be satisfied with respect to kick-down at an excessively high traveling speed or the prevention of an excess of the speed limit of the driving combustion engine after kick-down. These safety criteria are highly vehicle-specific and, therefore, must be adapted individually to each vehicle, so that the presentation of a corresponding parameter is superfluous.

Also, in order to prevent a change in the gear level g while driving round a bend after approaching or braking before entering a bend, the transversal acceleration aq(t) of the vehicle is monitored. The change in the gear level g is prevented or the interval T1(SK(t)) is zeroed provided the amount of transversal acceleration (|aq(t)|) exceeds a second transversal acceleration limit aqg2(v(t)) as a function of the traveling speed v(t) according to FIG. 4, or so long as a third interval T3(SK(t)) has not passed after the falling short of the transversal acceleration limit aqg2(v(t)). In this case, the second transversal acceleration limiting value aqg2(v(t)) for detecting bends—as is illustrated in FIG. 4—is clearly lower than the first transversal acceleration limit aqgl(v(t)).

Further, even during shearing action, changing gear, especially kick-downs, can be prevented and/or the intervals T1(SK(t)), T2(SK(t)), T3(SK(t)) can be zeroed, provided excessive wheel slip occurs at least at one of the wheels of the vehicle or the frictional connection between at least one wheel of the vehicle and the roadway is interrupted.

In this case, shifting is permitted only if the differential speed value Dv(t)=vref(t)-v(t) between the speed vref(t) of a non-driven axis and the traveling speed v(t) recorded on a driven axis does not exceed an acceptable differential speed value Dvzu1(SK(t)): Dv(t)<Dvzu1(SK(t)).

Further, when exceeding the acceptable differential speed value Dvzu1(SK(t)), a converter bridging coupling of a transmission fitted with a torque converter can be opened;

a stopping time Th can be set, during which an upshift cannot be prevented;

the engaged gear level g can be increased by one level (upshift), and kick-downs can be prevented; while these functions can be kicked down when tensile action is detected and positive values of the change in traveling speed v(t) exist.

Figure 6:
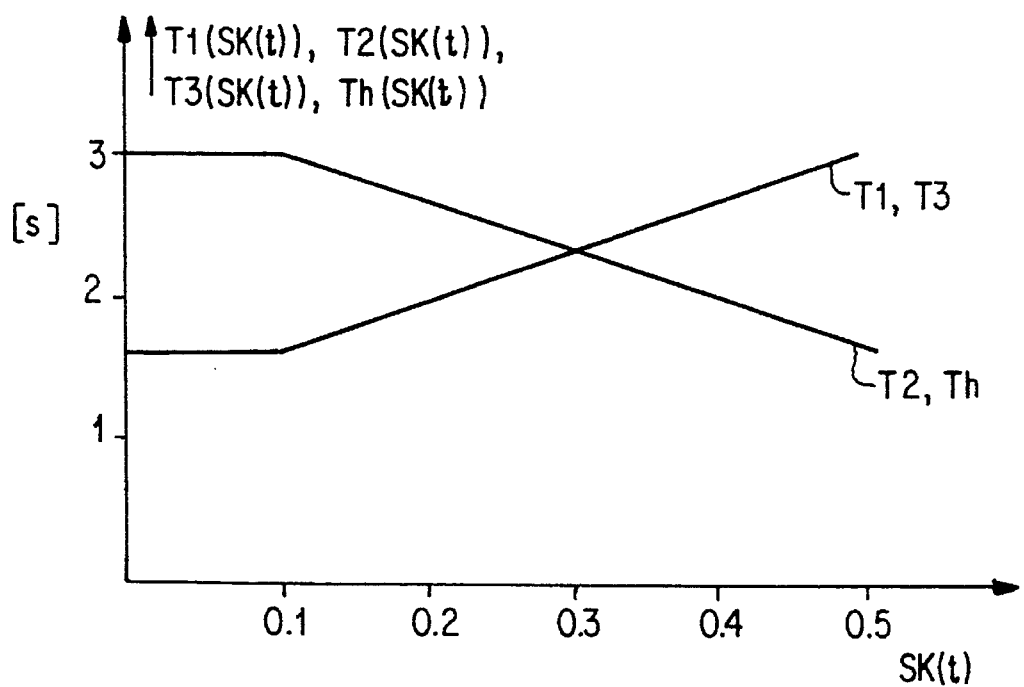
FIG. 6 shows a characteristic curve indicating the dependence of the intervals as a function of a driving activity.

The intervals T1(SK(t)), T2(SK(t)), T3(SK(t)) can both be of similar and varying length, and at least one of the intervals or of the traveling speed limiting value vg(g, SK(t), t) or the gear level-dependent factor k(g−1, SK)t)) or the acceptable differential speed value Dvzu1(SK(t)) are adjustable at random and, preferably together with adjusting the shifting parameters SKFj, can be so adjusted (consumption-optimized shift parameter SKF1, performance-optimized parameter SKF2) by means of the program selector switch 15, that with a greater number of performance-optimized parameters (driving programs) the intervals TI(SK(t)), T3(SK(t)) and the traveling speed limiting value vg(g, SK(t), t) increase and the intervals T2(SK(t)), Th(SK(t)), the gear level-dependent factor k(g−1, SK(t)) and the acceptable differential speed value Dvzu1(SK(t)) decrease (see FIG. 5 or FIG. 6).

If the transmission control provides for an automatic adaptation of the shift parameters to the driver's style of driving or a traffic situation, at least one of the intervals T1(SK(t)), T2(SK(t)) or Th(SK(t)) or at least the traveling speed limiting value vg(g, SK(t)) or the gear level-dependent factor k(g−1, SK(t)) or the acceptable differential speed value Dvzul(SK(t)) may be a function of the driving activity SK(t), which makes a long-term evaluation of the driver's style of driving or action in a traffic situation with respect to controlling the vehicle. As the driving activity SK(t) grows and becomes more performance-oriented, the intervals T1(SK(t)), T3(SK(t)) and the traveling speed limiting value vg(g, SK(t), t) increase and the intervals T2(SK(t)), Th(SK(t)), the gear level-dependent factor k(g−1, SK(t)) and the acceptable differential speed value Dvzu1(SK(t)) decrease (see FIG. 5 or FIG. 6).

The driving activity SK(t) is determined by a long-term evaluation of the driver's style of driving and action in a traffic situation with respect to functional correlation (continuous mean value formation) of actual and past values or a single operating characteristic quantity of a motor vehicle or a single operating characteristic quantity or a single quantity comprised of several operating characteristic quantities of a motor vehicle. This, for example, can occur analogously to the method illustrated in DE 39 22 051 A1 or DE 33 41 652 C2.

We claim:

1. A method for controlling an automatic transmission (2) of a motor vehicle fitted with a combustion engine, while the combustion engine is influenced via control elements, including at least one of an accelerator pedal and a throttle valve, and gear levels (g) of the transmission (2) are shifted via shifting parameters (SKFj) which, at least as a function of the throttle valve position (alpha(t)), the traveling speed (v(t)) and the motor speed (nmot)t)), are shifted automatically, the method comprising the steps of:

performing kick-downs (increase in the gear when:

(1) at least one of a service brake of the vehicle is engaged, (brake signal b(t)=1), and the time variation of the traveling speed (dv(t)/dt) is less than a first negative longitudinal acceleration limiting value (albg(g, nmot, t), albg(g, nmot, t)<0): (dv(t)/dt<albg(g, nmot, t)); and (2) the transversal acceleration (aq(t)) recorded via a transversal acceleration sensor (17) lies below a first traveling speed-dependent transversal acceleration limit aqg1(v(t)): aq(t)<aqg1(v(t)); and (3) the time variation of the traveling speed (dv(t)/dr) is higher than a second negative longitudinal acceleration limiting value (albbg(nmot, g, SK(t), t)=k(g−1, SK(t))*dv/dtlg−1): (dv(t)dt>albbg(nmot, g, SK(t), t); dv(t)dt>=k(g−1, SK(t))*dv/dtlg−1); and (4) the traveling speed (v(t)) is less than a second traveling speed acceleration limiting value (vg(g, SK(t), t)): (v(y)<vg(g, SK(t), t)).

2. A method as defined in claim 1, wherein kick-down is permitted only during a condition, in which upshifts (decrease in the gear ratio) are prevented (condition of upshift prevention (hsv) is active, (hsv=1)), while the condition of upshift prevention changes to active (hsv−1) when a time variation (dalpha(t)/dt) of the throttle valve position alpha(t) goes below a negative limiting value (−alphag) and the shearing action is identified, and while the condition of uplift prevention (hsv) changes to inactive (hsv=0), as soon as the tensile action has been identified after completion of the first interval (T1(SK(t))).

3. A method as defined in claim 2, wherein is always performed by one gear level, while between shifting actions there lies at least a second interval (T2(SK(t))).

4. A method as defined in claim 1 wherein kick-down is performed to the gear level (g), which is acceptable for the instantaneous operating point of the vehicle in the instantaneously set shift parameter (SKFj).

5. A method as defined in claim 1 wherein a first negative longitudinal acceleration limiting value (albg(g, nmot, t)) is a function of the instantaneous values of the engaged gear level (g) and the motor speed (nmot(t)) and in this case corresponds to the respective (negative) longitudinal acceleration (dv/dt and thus the deceleration) of the vehicle running with a shut throttle (throttle valve position alpha=0) in the condition defined herein on a level roadway, with the respective pairs of value of the instantaneously engaged gear level (g) and the motor speed (nmot).

6. A method as defined in claim 5, wherein the first negative longitudinal acceleration limiting value (albg(g, nmot, t)) is determined from the instantaneous values of the gear level (g) and the traveling speed (v(t)) via a first parameter (ALB(g, nmot)): (albg(g, nmot, t)=ALB(g, nmot)).

7. A method as defined in claim 6, wherein the second negative longitudinal acceleration limiting value (albbg(nmot, g, SK(t), t)=k(g–1, SK(t))*dv/dtlg–1<0) is determined according to a product from a gear level-dependent factor (k(g–1, SK(t))) and a value (dv/dtlg–1) to be determined with the instantaneous value of the traveling speed (v(t)), which is determined in longitudinal acceleration expected in the next gear level (g–1), in that in the motor speed (mot(t)|g–1=i(g–1)*v(t)) expected in the next lowest gear level (g–1) is determined from the instantaneous value of the traveling speed (v(t)) and the value of the gear ratio (i(g–1)) at the next lowest gear level (g–1), and to which is allocated a value of the longitudinal acceleration (dv/dtlg–1) expected in the next gear level (g–1), which is determined via the parameter ALB(g, nmot)) from the next lowest gear level g–1 and the expected motor (speed nmot(t)|g–1).

8. A method as defined in claim 7, wherein the gear level-dependent factor (k(g–1, SK(t))) is determine via second parameter (k(g–1, SK(t))=F(g, SK(t))) from the next lowest gear level g–1.

9. A method as defined in claim 1 wherein the second traveling speed limiting value (vg(g, SK(t), t)) is at least a function of the momentarily engaged gear level (g).

10. A method as defined in claim 1, wherein one of the change in the gear level (g) is prevented, and the interval (T1(SK(t))) is zeroed, provided one of the amount of transversal acceleration (|aq(t)|) exceeds a second transversal acceleration limit (aqg2(v(t))) as a function of the traveling speed (v(t)) and so long as a third interval (T3(SK(t))) has not passed after the falling short of the transversal acceleration limit (aqg2(v(t))).

11. A method as defined in claim 1, further comprising at least one of the steps of:
   determining whether excessive wheel slip occurs at least at one of the wheels; and
   determining whether a frictional connection between at least one of the wheels and the roadway is interrupted;
   wherein at least one of a kick-down is prevented and at least one of the intervals (T1(SK(t))), (T2(SK(t))), (T3(SK(t))) are zeroed, provided one of excessive wheel slip occurs at least at one of the wheels of the vehicle and the frictional connection between at least one wheel of the vehicle and the roadway is interrupted.

12. A method as defined in claim 1, wherein a kick-down is permitted only if a differential speed value (Dv(t)=vref(t)–v(t)) between the speed (vref(t)) of a non-driven axis and the traveling speed (v(t)) recorded on a driven axis does not exceed an acceptable differential speed value (Dvzul-(SK(t))): (Dv(t)=<Dvzul(SK(t))).

13. A method as defined in claim 12, wherein when exceeding the acceptable differential speed value (Dvzul-(SK(t))),
   a converter bridging coupling of a transmission fitted with a torque converter is opened;
   a stopping time (Th(SK(t))) is set, during which an upshift cannot be prevented;
   the engaged gear level(g) is increased by one level and
   kick-downs are prevented; while these functions are kicked down when tensile action is detected and positive values of the change in traveling speed (dv(t)/dt) exist.

14. A method as defined in claim 13, wherein the intervals (T1(SK(t))), T2(SK(t))), (T3(SK(t))) can both be of similar and varying length, and at least one of the following are arbitrarily adjusted: at least one of the intervals, the traveling speed limiting value (vg(g, SK(t), t)), the gear level-dependent factor (k(g–1, SK)t))), and the acceptable differential speed value (Dvzul(SK(t))) and, together with adjusting the shifting parameters (SKFj), are so adjusted (consumption-optimized driving program, shift parameter SKF1; performance-optimized driving program, shift parameter SKF5) via the program selector switch 15, that with a greater number of performance-optimized parameters (driving programs) the intervals (T1(SK(t))), (T3(SK(t))) and the traveling speed limiting value vg(g, SK(t), t) increase and the intervals (T2(SK(t))), (Th(SK(t))), the gear level-dependent factor (k(g–1, SK(t))) and the acceptable differential speed value (Dvzul(SK(t))) decrease.

15. A method as defined in claim 14, wherein one of the following is a function of the driving activity (SK(t)): at least one of the intervals (T1(SK(t))), (T2(SK(t))), (Th(SK(t))), at least the traveling speed limiting value (vg(g, SK(t))), the gear level-dependent factor (k(g–1, SK(t))), and the acceptable differential speed value Dvzul(SK(t))), which makes the long-term evaluation of the driver's style of driving and action in a traffic situation with respect to controlling the vehicle, and as the driving activity (SK(t)) grows and becomes more performance-oriented, the intervals (T1(SK(t))), (T3(SK(t))) and the traveling speed limiting value (vg(g, SK(t), t)) increase and the intervals (T2(SK(t))), (Th(SK(t))), the gear level-dependent factor (k(g–1, SK(t))) and the acceptable differential speed value (Dvzul(SK(t))) decrease.

16. A method as defined in claim 15, wherein the driving activity (SK(t)) is determined by a long-term evaluation of the driver's style of driving and action in a traffic situation with respect to one of the functional correlation (continuous mean value formation) of actual and past values of a single operating characteristic quantity or a single quantity, and comprised of several operating characteristic quantities of a motor vehicle.

17. A method for controlling an automatic transmission of a motor vehicle fitted with a combustion engine, while the combustion engine is influenced via a power control element, and gear positions (g) of the transmission are shifted via characteristic shifting diagrams (SKFj) which, at least as a function of a throttle valve position (alpha(t)), a traveling speed (v(t)) and a motor speed (nmot)t)), are shifted automatically, the method comprising the steps of:
   performing a backshift (increase in the gear ratio) when:
      (1) a time variation of the traveling speed (dv(t)/dt) is lower than a first negative longitudinal acceleration limiting value (albg(g,nmot,t);
      (2) a transversal acceleration (aq(t)) recorded via a transversal acceleration sensor (17) lies below a first transverse acceleration limit curve (aqgl(v(t));
      (3) a time variation of the traveling speed (dv(t)/dt) is higher than a second negative longitudinal acceleration limiting value (albbg(nmot, g, SK(t), t); and
      (4) a traveling speed (v(t)) is less than a traveling speed limiting value (vg(g, SK(t), t));
   determining a second negative longitudinal acceleration limiting value (albbg(nmot, g, SK(t), t) according to a product from a gear position-dependent factor (k(g–1, SK(t))) and a value, to be determined with the instantaneous value of the traveling speed (v(t)), of the longitudinal acceleration to be expected in the next lower gear position (g–1);
   determining the motor speed (mot(t),|$_{g-1}$)) expected in the next lower gear position (g–1) from the instantaneous value of the traveling speed (v(t)) and the value of the gear ratio (i(g−1)) at the next lower gear level (g−1); and allocating a value to the longitudinal acceleration (dv/dt|$_{g-1}$) expected in the next lower gear position (g−1) which is determined via the characteristic diagram ALB(g, nmot)) from the next lower gear level g−1 and the determined value of the motor speed (nmot(t), |$_{g-1}$) to be expected in the next lower gear position (g−1).

18. A method as defined in claim 17, wherein the first negative longitudinal acceleration limiting value (albg(g, nmot, t)) is a function of the instantaneous values of the engaged gear position (g) and the motor speed (nmot(t)) and corresponds to the longitudinal acceleration (dv/dt and thus the deceleration) of the vehicle running with a shut throttle in the condition defined herein on a level roadway, with the respective pairs of values of the instantaneously engaged gear position (g) and the motor speed (nmot).

19. A method as defined in claim 18, wherein the first negative longitudinal acceleration limiting value (albg(g, nmot, t)) is determined from the instantaneous values of the gear position (g) and the traveling speed (v(t)) via a first characteristic diagram (ALB(g, nmot)).

20. A method as defined in claim 19, wherein the gear position-dependent factor (k(g−1, SK(t))) is determined via a second characteristic diagram (k(g−1, SK(t))) from the next lower gear position (g−1).

21. A method as defined in claim 17, wherein the traveling speed limiting value (vg(g, Sk(t), t)) is at least a function of the momentarily engaged gear position (g).

22. A method as defined in claim 17, wherein a change in the gear position (g) is prevented provided one of the amount of transversal acceleration (|aq(t)|) exceeds a second transversal acceleration limit (aqg2(v(t))) as a function of the traveling speed (v(t)), and so long as an interval (T3(SK(t))) has not passed after the falling short of the second transversal acceleration limit (aqg2(v(t))).

23. A method as defined in claim 17, wherein the backshift is always performed by one gear position, while between shifting actions there lies at least a second interval (T2(SK(t))).

24. A method according to claim 17, further comprising the step of arbitrarily adjusting at least one of the intervals (T2(SK(t)), (T3(SK(t))), at least the traveling speed limiting value (vg(g, Sk(t)) and the gear position-dependent factor (k(g−1, SK(t))), and, together with an adjustment of the characteristic shifting diagrams (SKDj) such that in the case of more power-optimized driving programs, the time interval (T3(SK(t))) and the traveling speed limiting value (vg(g, SK(t), t)) will increase, and the second interval (T2(SK(t))) and the gear position-dependent factor (k(g−1, SK(t))) will decrease.

25. A method according to claim 17, wherein one of the following is a function of a driving activity (SK(t)): at least one of the intervals (T1(SK(t)), (T2(SK(t)), (T3(SK(t)), Th(SK(t))), at least the traveling speed limiting value (vg(g, Sk(t),t)), the gear position-dependent factor (k(g−1, SK(t))), and the acceptable differential speed value Dvzul(SK(t))), which makes an evaluation of one of: the driver's style of driving and a traffic situation, and as the driving activity (SK(t)) grows and becomes more power-oriented, the intervals (T1(SK(t)), (T3(SK(t))) and the limiting value (vg(g, SK(t) , t)) increase and the intervals (T2(SK(t)), (Th(SK(t))), the gear position-dependent factor (k(g−1, SK(t))) and the acceptable differential speed value (Dvzul(SK(t))) decrease.

* * * * *